United States Patent [19]

Cusack

[11] 4,451,987
[45] Jun. 5, 1984

[54] TOUCH PROBE

[75] Inventor: Robert F. Cusack, Grosse Pointe, Mich.

[73] Assignee: The Valeron Corporation, Mich.

[21] Appl. No.: 388,187

[22] Filed: Jun. 14, 1982

[51] Int. Cl.³ ............................................. G01B 7/03
[52] U.S. Cl. ................................................ 33/174 L
[58] Field of Search ............. 33/169 R, 172 E, 174 L, 33/174 P

[56] References Cited

U.S. PATENT DOCUMENTS

| 3,122,970 | 3/1964 | Rhoades | 90/62 |
| 3,180,030 | 4/1965 | Witzke | 33/172 E |
| 3,219,782 | 11/1965 | Bissell et al. | 200/107 |
| 3,869,799 | 3/1975 | Neuer et al. | 33/174 L |
| 4,084,323 | 4/1978 | McMurtry | 33/174 L |
| 4,153,998 | 5/1979 | McMurtry | 33/174 L |
| 4,158,919 | 6/1979 | McMurtry | 33/174 L |
| 4,203,225 | 5/1980 | Nilsson | 33/174 L |
| 4,254,554 | 3/1981 | Germano et al. | 33/174 L |
| 4,270,275 | 6/1981 | McMurtry | 33/174 L |
| 4,279,080 | 7/1981 | Nakaya | 33/174 L |
| 4,334,362 | 6/1982 | Germano et al. | 33/174 L |
| 4,364,178 | 12/1982 | Huet | 33/174 L |
| 4,397,093 | 8/1983 | McMurtry | 33/172 E |

FOREIGN PATENT DOCUMENTS

| 60303 | 5/1981 | Japan | 33/169 R |
| 845795 | 8/1960 | United Kingdom . | |
| 1445977 | 8/1976 | United Kingdom . | |
| 1531209 | 11/1978 | United Kingdom . | |
| 1586052 | 3/1981 | United Kingdom . | |
| 1589297 | 5/1981 | United Kingdom . | |
| 2094478 | 9/1982 | United Kingdom | 33/174 L |

Primary Examiner—Richard R. Stearns
Attorney, Agent, or Firm—Gordon K. Harris, Jr.; Donald A. Panek

[57] ABSTRACT

A touch probe for detecting contact with a workpiece or other object is disclosed and features a highly accurate repositioning system for returning the moveable portion of the touch probe to a predetermined rest position in the absence of contact force acting on the moveable portion.

18 Claims, 7 Drawing Figures

TOUCH PROBE

BACKGROUND OF THE INVENTION

1. Field of the Invention

The invention generally relates to position detection apparatus for use in measuring and gaging systems. More particularly, the invention concerns mechanical repositioning apparatus for use with a contact detection probe.

2. Description of the Prior Art

Automated machining systems and coordinate measuring systems require a precise means of locating surfaces of work parts. One method of such measurement, to which this invention pertains, utilizes detection of mechanical contact by a reference probe with the surface being measured in conjunction with a determination of the x, y and z axes location of the table or machine spindle at the time of reference probe contact. The accuracy of this approach depends on the capability of the detection system for accurately returning the probe to a predetermined rest position whenever no external contact force is being exerted on the probe. Further, since such contact force could displace the probe in any direction, the return or repositioning apparatus must be operative to accurately and repeatably restore the rest position state regardless of the direction of the prior probe displacement caused by contact with the surface undergoing measurement.

One prior art approach attempting to achieve a repeatably attainable probe rest position is disclosed in U.S. Pat. No. 4,270,275 - McMurtry, U.S. Pat. No. 4,153,998 - McMurtry, and U.S. Pat. No. 4,279,080 - Nakaya, each generally teaching a probe rest position defined by a plurality of locations or nests comprised of a pair of converging surfaces on either the moveable probe or a fixed reference point of the probe housing, said converging surfaces engaged by a curved surface on the other of either the moveable probe or fixed reference point.

Another prior art approach attempting to meet the same general objective of accurate probe repositioning uses a complex interconnection of reed springs. Such approaches are taught, for example, in U.S. Pat. No. 3,869,799 - Near et al., U.S. Pat. No. 4,084,323 - McMurtry, and U.S. Pat. No. 4,158,919 - McMurtry.

Notwithstanding the prior art approaches, there continues to be a long-felt need in the automated measuring art for a structurally simple, rugged, economic and repeatably accurate touch probe mechanical positioning system which is compatible with a variety of electrical or electro-optical contact detection indicating signal generator circuitry.

SUMMARY OF THE INVENTION

It is therefore a general object of this invention to fill the above long-felt need with a touch probe assembly incorporating improved mechanical probe repositioning apparatus.

A touch probe is provided with a stylus portion protruding from a housing. In a housing internal cavity the probe is coupled to a follower, or pivot plate, which is coupled to one side of a substantially planar resilient member, such as a reed spring. Another side of the resilient member is coupled to a reference surface stationary with respect to movement of the follower. At least three contact points are provided between the follower and the reference surface to define a stable rest position contact between the follower and the reference surface. The arrangement is such that the planar resilient member is capable of yielding to a contact force on the probe in transverse and axial directions, as indicated by movement of the follower, while accurately returning the probe to a repeatable rest location defined by the at least three contacts on cessation of such force.

DRAWING

The invention will be more clearly understood from a reading of a detailed description of a preferred embodiment, taken in conjunction with the drawing, in which:

FIG. 5 is an exploded perspective view of the repositioning apparatus of FIG. 1;

DETAILED DESCRIPTION

Figure 1:
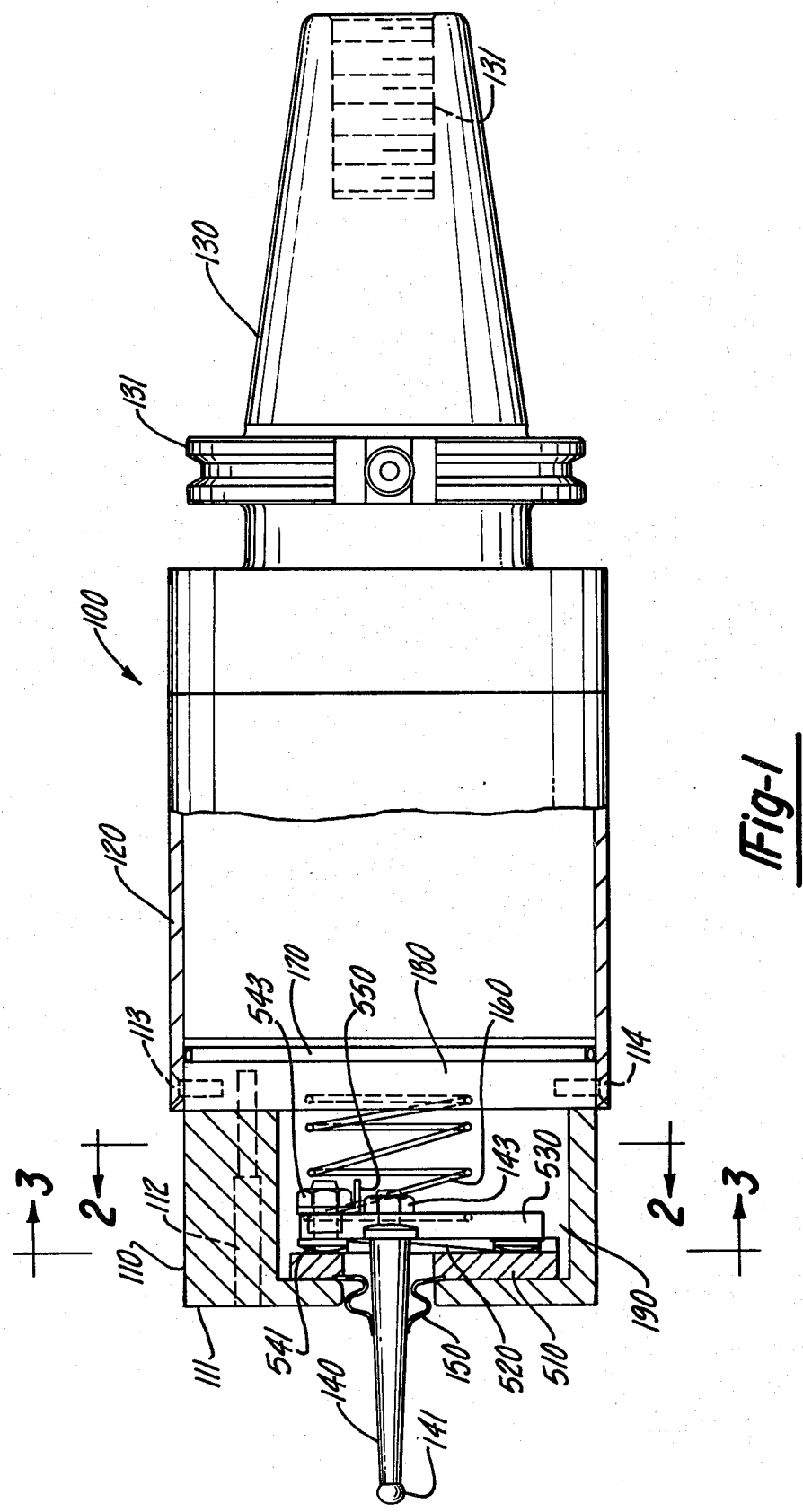
FIG. 1 is a plan view with partial cross-section of a touch probe arranged in accordance with the principles of the invention.

With general reference to all figures of the drawing, it should be noted that the same apparatus or component parts thereof are designated by the same reference numeral in all figures depicting such apparatus and component parts.

With reference to FIGS. 1-5 depicting a first embodiment of the invention, touch probe assembly 100 includes a stylus 140 extending through an aperture in front wall 111 of probe housing 110. Surrounding probe 140 in the aperture is a sealing diaphragm sleeve 150. Housing 110 further includes a rear wall comprised of mounting plate 180. Housing 110 is substantially cylindrical in shape between front wall 111 and mounting plate 180 and surrounds a cavity 190 for receipt of the stylus deflection following and return apparatus to be described in more detail below. Three mounting bolts 112, 115 and 116 (all seen from FIG. 2) couple the substantially cup-shaped portion of housing 111 to mounting plate 180.

Probe housing 111 is coupled via mounting screws 113, 114 (FIG. 1) and bolts 202, 204 (FIG. 2) to a substantially cylindrical hollowed housing 120 adapted to retain therein detection circuitry for use in conjunction with the mechanical apparatus housed in portion 110. One example of such circuitry is disclosed in pending U.S. Pat. application Ser. No. 259,257, filed Apr. 30, 1981, now U.S. Pat. No. 4,401,945 and assigned to the same assignee as the instant invention. The details of such circuitry are not required for an understanding of this invention and are therefore not repeated herein. The detection circuitry housed in portion 120 is sealed from outside contamination via O-ring 170 positioned adjacent mounting plate 180.

At an end of detection circuitry housing 120 opposite mounting plate 180 is rigidly coupled an adapter section 130 which may, for example, include a machine tool industry standard taper and a drive-key-receiving grooved flange 131, the adapter configured for receipt in a complementary socket of a machine tool spindle or tool holding turret. The adapter is typically pulled into such a socket via a drawbar (not shown) threadingly engaging adapter 130 via threaded receptacle 131. While not a necessary portion of the invention, adapter 130 is shown as an example of how the touch probe apparatus can easily be used in an NC machining center in the same way as a cutting tool is automatically selected and driven in a predetermined path under NC control. Alternatively, touch probe assembly 100 could be suitably shaped for use in a variety of other environments, including retention by a robotic manipulator.

Figure 2:
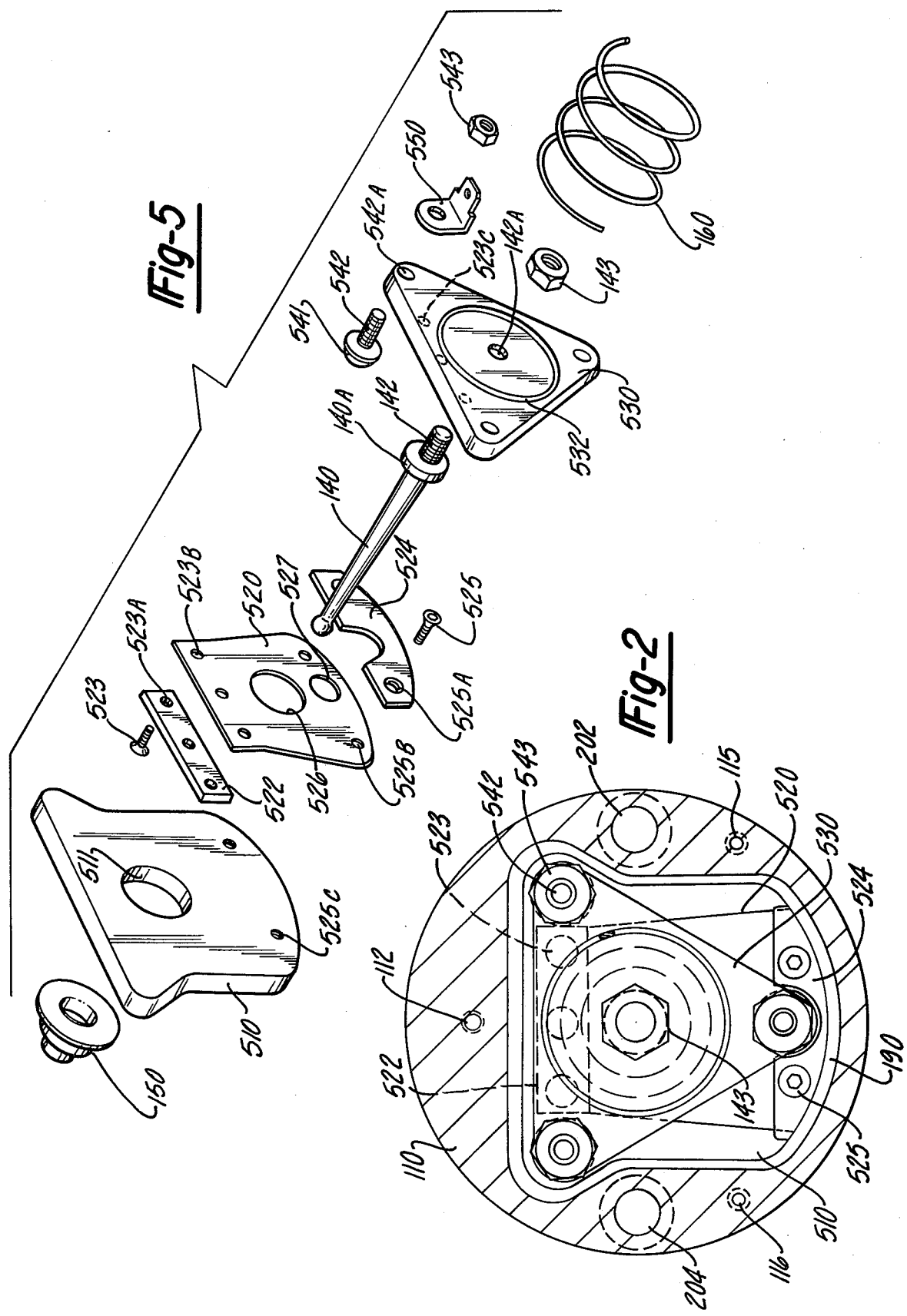
FIG. 2 is a sectional view as seen from line 2—2 of FIG. 1.
Figure 3:
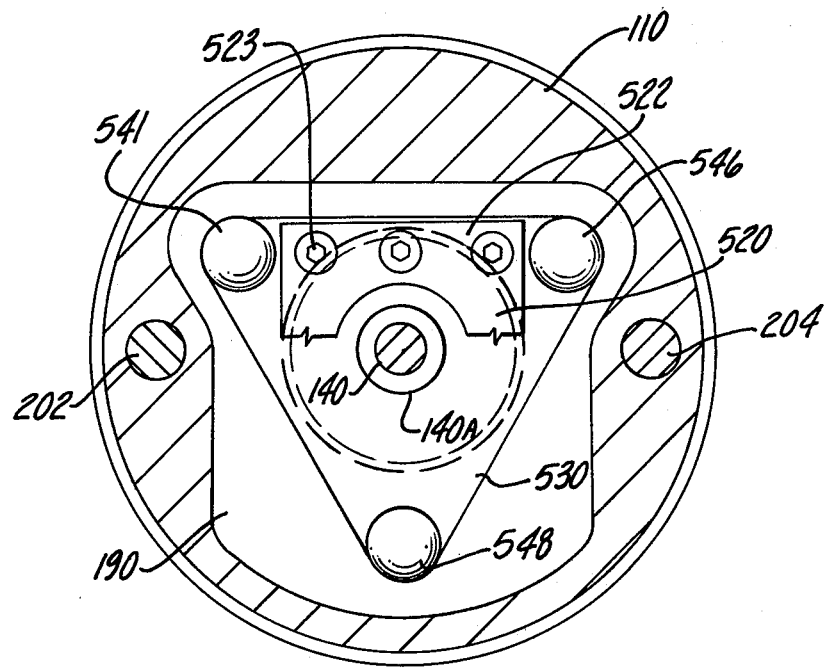
FIG. 3 is a sectional view as seen from line 3—3 of FIG. 1.
Figure 4:
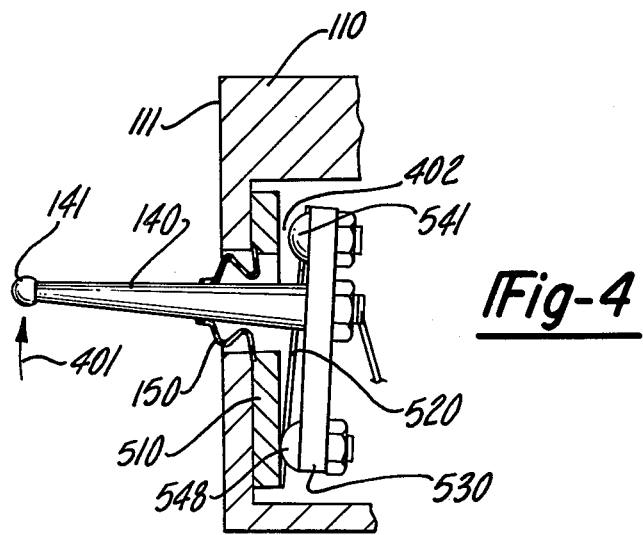
FIG. 4 is a partial cross-sectional view similar to that of FIG. 1 depicting the probe in a displaced position under a contact force.

With particular reference to FIGS. 2, 3 and 5, the probe deflection and return mechanism apparatus will now be described. Stylus 140 extends from contact tip 141 through the aperture in wall 111 and sleeve 150 to a connecting end comprising flanged portion 140A and threaded extension 142. Extension 142 is coupled via hole 142A and retaining nut 143 to a probe follower or pivot plate 530 which moves in response to contact force exerted on stylus tip 141.

At three corner regions of substantially triangulate plate 530, spherically shaped contacts 541, 546 and 548 are coupled to plate 530 via threaded shank portions of the contacts (such as portion 542 shown in FIG. 5) passing through mating holes 542A and a hole through terminal post 550 for engagement by contact retaining nut 543. Also coupled to plate 530 between contacts 541 and 546 is one side of a substantially planar resilient member, for example, reed spring 520. Connection of reed spring 520 to plate 530 is effected by three retention screws 523 passing through mating holes 523A in a first reed spring retainer 522, thence through mating holes 523B in reed spring 520 and threadingly engaging holes 523C in plate 530.

Reed spring 520 includes a first hole 526 substantially axially aligned with the aperture in housing wall 111 for passage of stylus 140 therethrough. Additionally, reed spring 520 includes hole 527 through which protrudes the spherically shaped contact 548. A second side of reed spring 520 is coupled to a base plate 510 which is regidly coupled to or, alternatively, an integral part of, housing wall 111. The purpose of base plate 510 is to provide a reference surface for contacts 541, 546 and 548, said reference surface being stationary with respect to the housing. Base plate 510 includes a hole 511 also axially aligned with the aperture in wall 111 for passage therethrough of stylus 140.

Reed spring 520 is coupled to base plate 510 by means of two screws 525 passing through mating holes 525A in a second reed spring retainer 524, thence through mating holes 525B in reed spring 520, and threadingly engaging holes 525C in base plate 510. The second reed spring retainer 524 has a cut-out portion suitably located to allow protrusion of contact 548 through hole 527 of reed spring 520 for engagement, in the rest position, with the reference surface provided by base plate 510.

With arrangement of the pivot plate, reference surface and intervening spherically shaped contacts and reed spring as shown, stylus 140 will be accurately and repeatably returned to a rest position defined by the three contact points on the reference surface under influence of reed spring 520 in the absence of contact force being exerted on stylus tip 141. To provide for greater probing force and to assure absence of stylus bounce or spurious rattling, a coiled bias spring 160 has one end engaging a suitably shaped annular groove 532 in pivot plate 530 and a second end engaging a corresponding groove in mounting plate 180. Spring 160 therefore provides additional bias force parallel to the longitudinal axis of stylus 140 thereby urging plate 530 and base plate 510 into rest position engagement via contacts 542, 546 and 548. The function of spring 160 could be furnished by selecting a reed spring 520 of suitable stiffness, but the required stiffness would be such that very limited probe stylus overtravel could be accomodated by the touch probe apparatus.

As will be apparent to those skilled in the relevant art, detection of the presence or absence of the three point contact rest position state between the pivot plate 530 and the base plate 510 may be effected in a variety of approaches. For example, an electrical signal indicative of the rest position could be generated by wiring one conductor lead from a diode summing network (not shown) in housing portion 120 to all three contacts 541, 546, 548 in parallel via terminal posts 550, and by coupling a reference potential from the detection circuitry to base plate 510. In this manner the true reference potential would be present on the conductor lead coupled in parallel to contacts 541, 546, 548 only when all three contacts bear against base plate 110. Hence, if a contact force such as in direction 401 of FIG. 4 were exerted on stylus tip 141, pivot plate 530 would follow the stylus motion to thereby lift contact 541 from reference surface 510 as seen as space 402 of FIG. 4. The altered electrical impedance at this point can then be detected by the circuitry housed in section 120 of FIG. 1 in a known manner.

Additional detection schemes, all contemplated as useable with the mechanical arrangement of the instant invention, include, for example and not by way of limitation, a series electrical circuit comprised of the contacts and electrically insulated contact sections of the reference surface on base plate 510, magnetic proximity detection between the contacts and the reference surface, capacitive proximity detection between the contacts and the reference surface, strain detection in the base plate or the pivot plate, or photo-detection of movement of the pivot plate with respect to the reference surface. One example of detection circuitry using a serially coupled set of contact points is disclosed in the above referenced U.S. Pat. No. 4,401,945. In the serial electronic circuit approach, it will be apparent to those skilled in the art that pivot plate 530 must either be nonconductive or else provided with suitable means insulating plate 530 from contacts 541, 546 and 548. Even with this added requirement, the series electrical circuit protection approach is generally preferred due to the resultant simplicity of the detection circuitry coupled to such a series connection of contact points.

Figure 6:
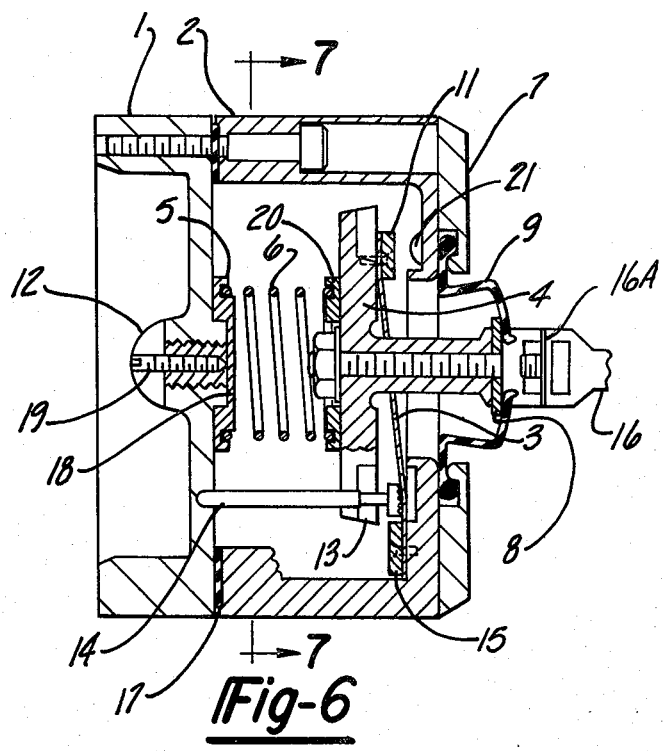
FIG. 6 is a cross-sectional view of an alternative embodiment.
Figure 7:
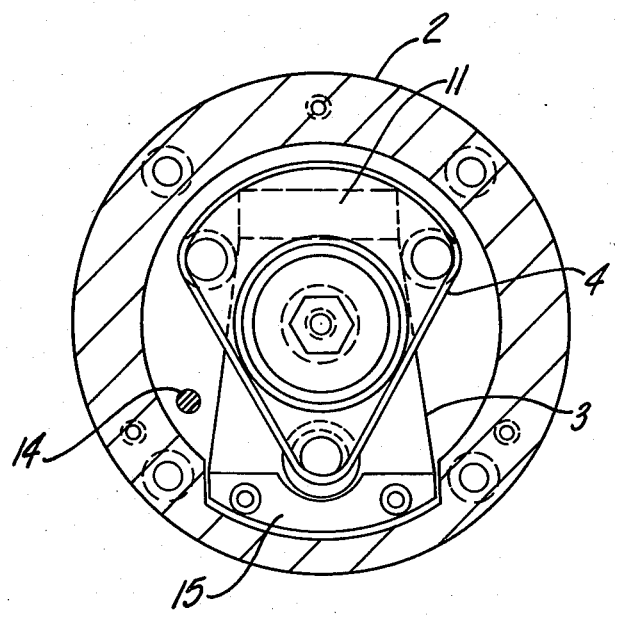
FIG. 7 is a sectional view taken from line 7—7 of FIG. 6.

An alternative embodiment of a touch probe system arranged in accordance with the principles of the invention is depicted in FIGS. 6 and 7. As seen in FIGS. 6 and 7, the alternative touch probe has a two-piece stylus comprised of a removable contact or tip portion 16 joined at juncture 16A to permanently mounted stylus base portion or mounting portion 10. With this design, a variety of stylus tip sizes and shapes may be easily coupled to the touch probe system of FIG. 7 at a coupling point 16A conveniently external to main probe housing body 2.

Bolted to a front wall of body 2 is a covering clamp 7 arranged to hold the outer perimeter of a sealing diaphragm 9 in place, the inner boundary of diaphragm 9 being retained by a washer 8 on the one side of the diaphragm and by a flanged portion of stylus mounting end 10 at the outer side of the diaphragm.

A rear wall of housing 2 is comprised of mounting plate 1 which may be electrically insulated from bias spring 6 by one of two nylon insulating washers 5. A second nylon insulating washer 20 electrically isolates the other end of spring 6 from pivot plate 4. A sealing gasket 17 is placed between mounting plate 1 and housing body 2. Further provided at the rear housing wall 1 is a bias spring bearing plate 18, which, in conjunction with adjusting device 19 rotated by a screw head portion 12, can vary the force exerted by bias spring 6 on pivot plate 4. Bearing plate 18 is shown as integral with insulator 5, but could be a separate component.

As in the earlier described embodiment, the touch probe of FIGS. 6 and 7 has pivot plate 4 coupled to the mounting end 10 of the stylus for movement therewith. Unlike the earlier embodiment, the probe apparatus of FIGS. 6 and 7 utilizes an integral surface of housing 2 as the fixed reference surface and mounts spherically shaped contacts 21 to this fixed surface rather than to the pivot plate. Mounted to pivot plate 4 across from each spherically shaped contact 21 are wear resistant pads 13 presenting substantially planar surfaces for engagement by contact 21. Pads 13 and spherically shaped contact surfaces 21 preferably comprise a wear resistant material such as cemented tungsten carbide. Use of a wear resistant planar surface in conjunction with a spherical contact point has been found to avoid the necessity for filling the internal housing cavity with lubricating fluid, which, in turn, can be a source of problems with associated electrical detection circuitry.

Reed spring 3 is coupled at one side thereof via a first retainer 11 to pivot plate 4 and is coupled at another side via a second retainer 15 to the integral reference surface which extends substantially normal to the axis of the stylus about a probe aperture in the front wall of housing 2.

Spring contact probe 14 has a serrated end bearing against the reference surface integral to housing 2 and extends back into mounting plate 1 to assure electrical continuity between the front and rear portions of the housing.

Prototype touch probes arranged in accordance with the principles of the invention have shown improved repeatability in the accurate repositioning of the stylus to its rest position whenever contact force is removed from the stylus. One prototype touch probe was cycled two million times along a worst-case axis and exhibited a repeatable return accuracy of better than twelve microinches, two sigma. Such improved performance derives from the combined natural ability of a flat plate to rest securely and accurately on three equally spaced contact points and the ability of a substantially planar resilient member to locate the flat plate at the same repeatable lateral position on the contact points.

It should be noted that the invention described herein has been illustrated with reference to a particular set of embodiments. It is to be understood that many details used to facilitate the descriptions of such particular embodiments are chosen for convenience only and without limitation on the scope of the invention. Other embodiments may be devised by those skilled in the art without departing from the scope and spirit of the invention. Accordingly, the invention is intended to be limited only by the scope and spirit of the appended claims.

I claim:

1. Apparatus for use in detecting contact with another object comprising:
   probe means having a contact portion and a mounting portion;
   follower means coupled to the mounting portion of the probe means for movement therewith;
   a reference surface stationary with respect to movement of the follower means;
   At least three contact means each comprising an outermost portion of a surface protruding from one of the follower means and the reference surface; and
   a substantially planar resilient member positioned between the follower means and the reference surface, the resilient member coupled to the follower means only at a single portion of the follower means between two of the at least three contact means and to a portion of the reference surface adjacent a third contact means remote from said two contact means such that each outermost portion of the protruding contact means surfaces is urged into engagement with a respective substantially planar opposing portion of the other one of the follower means and the reference surface whenever the contact portion of the probe means is not moved by contact with the object.

2. The apparatus of claim 1 wherein each contact means protruding surface is spherically shaped.

3. The apparatus of claim 2 wherein each spherical surface protrudes from the follower means.

4. The apparatus of claim 2 wherein each spherically shaped surface protrudes from the reference surface.

5. The apparatus of claim 1 wherein each respective substantially planar opposing portion is comprised of a wear resistant cemented carbide material.

6. The apparatus of claim 1 wherein the probe means further comprises:
   a stylus carrying the contact portion and being removeably coupled to the mounting portion, whereby the stylus is easily replaced.

7. The apparatus of claim 1 wherein the probe means has a longitudinal axis extending between the contact portion and the mounting portion and substantially normal to the reference surface, and wherein the contact means are spaced equiangularly about said axis.

8. Touch probe apparatus comprising:
   a housing:
   a stylus moveable with respect to the housing and extending from a mounting end located within the housing through an aperture in a front wall of the housing to a stylus contact end located exteriorly of the housing;
   a pivot plate coupled to the stylus mounting end for movement therewith;
   a substantially planar reference surface rigidly associated with the housing and facing the pivot plate;
   at least three substantially spherical shaped contacts spaced equiangularly about a longitudinal axis of the stylus, each contact protruding from one of the pivot plate and the reference surface; and
   a substantially planar reed spring positioned between the pivot plate and the reference surface, the reed spring coupled at a first edge portion to the pivot plate only at a single portion of the pivot plate between two of the at least three contacts and to a portion of the reference surface adjacent a third contact remote from said two contacts in a manner such that each spherically shaped contact is urged into engagement with a respective substantially planar portion of the other one of the pivot plate and the reference surface.

9. The touch probe apparatus of claim 8 wherein the reference surface comprises an integral portion of the housing extending about the aperture substantially normally to a longitudinal axis of the stylus.

10. The touch probe apparatus of claim 8 wherein each spherically shaped contact protrudes from the reference surface opposite a corresponding planar portion of the pivot plate comprised of a wear resistant cemented carbide material.

11. The touch probe apparatus of claim 8 further comprising a substantially cylindrical peripheral housing wall joining said front wall with a rear housing wall to define an internal housing cavity in which the reference surface, reed spring and pivot plate are located, the rear wall including abutment means facing the cavity and a stylus biasing spring having a first end bearing against the pivot plate and a second end bearing against the abutment means.

12. The touch probe apparatus of claim 11 further comprising adjustment means extending through the rear housing wall and engaging the abutment means and operative upon actuation to alter a force exerted by the bias spring on the pivot plate.

13. The touch probe apparatus of claim 12 wherein the adjustment means comprises a screw threaded through the rear housing wall, operative upon rotation thereof to move the abutment means towards and away from the pivot plate.

14. The touch probe apparatus of claim 8 wherein the stylus further comprises a permanent portion extending from the mounting end through the aperture and a replaceable tip portion containing the stylus contact end removeably coupled to the permanent portion at a position external to the housing.

15. Apparatus for use in detecting contact with an object comprising:
a substantially cylindrical housing having an internal cavity defined by front, peripheral and rear housing walls and having an aperture in the front wall extending from an outer surface thereof to the cavity;
a substantially planar reference surface in the cavity surrounding the aperture;
a substantially planar reed spring coupled at a first boundary portion thereof to the reference surface and having a hole therethrough substantially aligned with the aperture;
a substantially triangulate pivot plate coupled at one side thereof to a second boundary portion of the reed spring at a reed spring surface facing away from the reference surface, corners of the triangulate pivot plate positioned substantially equidistant from a common longitudinal axis of the spring hole and aperture, two corner regions of the pivot plate facing the reference surface beyond the extremities of the connection between the reed spring and the pivot plate, a third corner region of the pivot plate facing the reference surface through an opening in the reed spring;
three substantially spherically shaped contacts, each protruding from one of the reference surface and the pivot plate at a corner region of the pivot plate;
an elongate probe stylus having a longitudinal axis substantially identical to that of the aperture and the spring hole, the stylus rigidly coupled at one end to the pivot plate and extending through the spring hole and aperture to a contact end exterior to the housing;
wherein the reed spring is operative to urge the pivot plate and the reference surface into a repeatably accurate three point rest position interengagement via the spherically shaped contacts whenever the contact end of the stylus is not contacting the object.

16. The apparatus of claim 15 further comprising a coiled bias spring having a first end of the coil engaging the pivot plate, and an abutment surface at the rear housing wall facing the pivot plate and engaging a second end of the coil.

17. The apparatus of claim 16 further comprising screw threaded adjustment means extending through the rear housing wall and engaging the abutment means, operative upon rotary actuation to alter a force exerted on the pivot plate by the coiled bias spring.

18. In a contact detection system, mechanical repositioning apparatus for returning relative moving first and second members to a rest position in the absence of contact force acting on one of the first and second members, the mechanical repositioning apparatus comprising:
at least three contact means positioned between the first and second members and shaped to define stable contact between the first and second members in the rest position; and
a substantially planar resilient locating member positioned between the first and second members, the locating member coupled at one side thereof to the first member only at a single portion of the first member between two of the at least three contact means and at another side thereof to the second member adjacent a third contact means remote from said two contact means in a manner such that the first and second members are accurtely urged toward the rest position defined by the contact means in the absence of said contact force.

* * * * *